United States Patent
Bailly et al.

(10) Patent No.: US 12,445,064 B2
(45) Date of Patent: Oct. 14, 2025

(54) POWER CONVERTER COMPRISING AT LEAST TWO SWITCHES AND A MODULE FOR SUPPLYING CONTROL SIGNALS THERETO

(71) Applicant: Commissariat à l'Energie Atomique et aux Energies Alternatives, Paris (FR)

(72) Inventors: Alain Bailly, Rousset (FR); Dominique Bergogne, Grenoble (FR)

(73) Assignee: Commissariat à l'Energie Atomique et aux Energies Alternatives (FR)

( * ) Notice: Subject to any disclaimer, the term of this patent is extended or adjusted under 35 U.S.C. 154(b) by 263 days.

(21) Appl. No.: 18/253,889

(22) PCT Filed: Nov. 29, 2021

(86) PCT No.: PCT/EP2021/083287
§ 371 (c)(1),
(2) Date: May 22, 2023

(87) PCT Pub. No.: WO2022/117481
PCT Pub. Date: Jun. 9, 2022

(65) Prior Publication Data
US 2024/0007020 A1    Jan. 4, 2024

(30) Foreign Application Priority Data
Dec. 1, 2020   (FR) ...................................... 2012453

(51) Int. Cl.
*H02M 7/538*    (2007.01)
*H02M 1/08*    (2006.01)
*H02M 7/219*    (2006.01)
*H02M 7/5387*    (2007.01)

(52) U.S. Cl.
CPC ......... *H02M 7/53873* (2013.01); *H02M 1/08* (2013.01); *H02M 1/082* (2013.01); *H02M 7/219* (2013.01)

(58) Field of Classification Search
CPC .... H02M 1/08; H02M 1/082; H02M 7/53873; H02M 7/219
See application file for complete search history.

(56) References Cited

U.S. PATENT DOCUMENTS

| 10,840,798 B1 | 11/2020 | Jelaca et al. |
| 2002/0131286 A1 | 9/2002 | Zametzky |
| 2016/0315184 A1* | 10/2016 | Ishimaru ................. H01L 24/73 |

(Continued)

OTHER PUBLICATIONS

Preliminary Search Report for French Application No. 2012453 dated Jul. 28, 2021, 7 pages.

(Continued)

*Primary Examiner* — Monica Lewis
*Assistant Examiner* — Lakaisha Jackson
(74) *Attorney, Agent, or Firm* — Jordan IP Law, LLC

(57) ABSTRACT

The present invention concerns an electronic device comprising: a first switch (T1) having a single voltage blocking direction; a second switch (T2) electrically in series with the first switch between two nodes (15, 17) of application of a DC voltage; and a module configured to supply the second switch with a control signal, referenced to the potential (COM) of a midpoint (16) between the two switches.

16 Claims, 5 Drawing Sheets

(56) References Cited

U.S. PATENT DOCUMENTS

| | | | |
|---|---|---|---|
| 2018/0191152 A1* | 7/2018 | Ishimaru | H02H 7/067 |
| 2018/0351475 A1 | 12/2018 | Yokoi et al. | |
| 2019/0016249 A1* | 1/2019 | Ichikawa | H05B 45/48 |
| 2022/0182006 A1* | 6/2022 | Nakamura | H02M 1/08 |

OTHER PUBLICATIONS

International Search Report for International Application No. PCT/EP2021/083287 dated Feb. 24, 2022, 3 pages.
International Preliminary Report on Patentability for International Application No. PCT/EP2021/083287 dated May 11, 2022, 5 pages.

\* cited by examiner

POWER CONVERTER COMPRISING AT LEAST TWO SWITCHES AND A MODULE FOR SUPPLYING CONTROL SIGNALS THERETO

FIELD

The present disclosure generally concerns electronic devices and, more specifically, power converters. The present disclosure more precisely concerns the control of power switches of such a converter.

BACKGROUND

Power converters are widely used in electronics and many power converter assemblies are known.

The converters to which the described embodiments apply comprise a rectifying branch or inverter branch comprising two power switches in series between two nodes of application of a DC voltage.

A recurring problem of power converters with an inverter branch lies in the control of the power switches from low-voltage electronic circuits, typically based on the digital signals supplied by a microcontroller.

SUMMARY

There is a need to improve power converters and, more particularly, circuits for controlling branches of power switches.

An embodiment overcomes all or part of the disadvantages of known control circuits and power converters.

An embodiment provides an electronic device comprising:
- a first switch having a single voltage blocking direction;
- a second switch, electrically in series with the first switch between two nodes of application of a DC voltage; and
- a module configured to supply the second switch with a control signal, referenced to the potential of a midpoint between the two switches.

According to an embodiment, said midpoint is coupled to a node of application of an AC voltage.

According to an embodiment, said shaping assembly comprises a field-effect transistor.

According to an embodiment, the first switch has a reverse conduction, like a diode.

According to an embodiment, the first switch comprises at least one diode having its cathode facing said midpoint.

According to an embodiment, the first switch further comprises a field-effect transistor.

According to an embodiment, the module comprises:
a first circuit for controlling the first switch, configured to receive a first square-pulse control signal, referenced to the potential of said midpoint; and
a second circuit for controlling the second switch, configured to receive a second square-pulse control signal, referenced to the potential of said midpoint.

According to an embodiment, the first circuit comprises, between an input terminal of application of the first signal and an output terminal, a first diode and an assembly for shaping the first signal between a level of a terminal for supplying a first potential positive with respect to a conduction terminal of the first switch, opposite to said midpoint, and said potential of said midpoint.

According to an embodiment, the second circuit comprises, between an input terminal of application of the second signal and an output terminal, an assembly for shaping the second signal between said first positive potential and said potential of said midpoint.

According to an embodiment, the first switch and the second switch are N-channel field-effect transistors.

According to an embodiment, the first switch is a diode and the second switch is a field-effect transistor.

According to an embodiment, the field-effect transistor(s) are HEMT transistors.

According to an embodiment, the device further comprises a circuit for validating said control signals according to the biasing of the AC voltage.

According to an embodiment, said validation circuit comprises logic circuits for supplying the control signals to the first and second circuits, these logic circuits being controlled by detectors of the biasing of the AC voltage with respect to said midpoint.

An embodiment provides a power converter comprising:
an electronic device such as described; and
a third switch and a fourth switch in series between the two nodes of application of a DC voltage.

An embodiment provides a method of controlling an electronic device such as described, comprising the setting to the on state of the first switch and the setting to the off state of the second switch when the AC voltage has a firs sign, and the setting to the off state of the first switch and the setting to the on state of the second switch when the AC voltage has a second sign.

An embodiment provides an AC/DC converter, comprising an electronic device such as described or configured to implement a control method such as described.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION OF THE PRESENT EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the applications powered by the embodiments of the described converters have not been detailed, the described embodiments being compatible with any application of a power converter with power switch branches.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made, unless specified otherwise, to the orientation of the figures.

Unless specified otherwise, the expressions "around", "approximately", "substantially" and "in the order of" signify within 10%, and preferably within 5%.

To simplify the following description and unless specified otherwise, when reference is made to high or low states of control or bias signals, levels corresponding to the power supply potentials of the circuits generating these states are considered, thus neglecting the on-state voltage drops of transistors, diodes, or resistors setting these levels.

Figure 1:
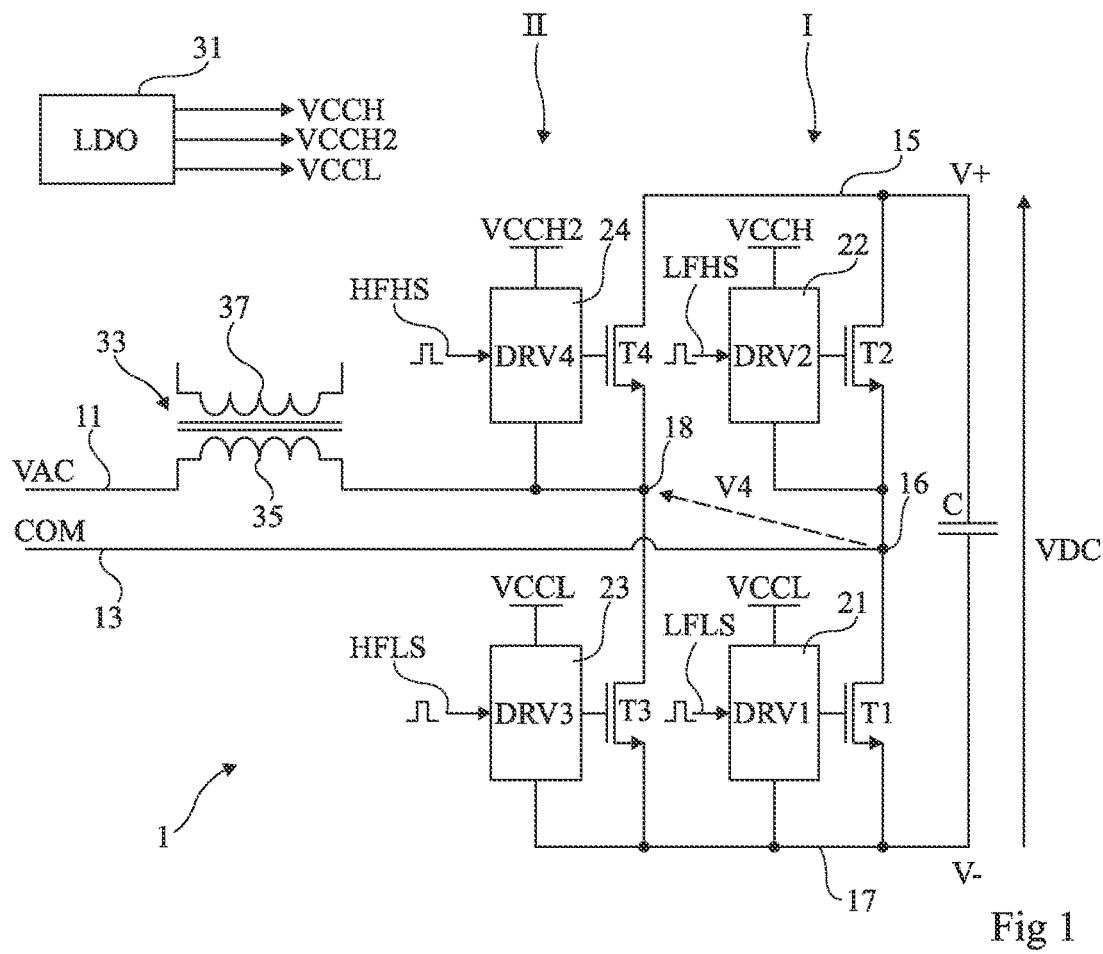
FIG. 1 very schematically shows an embodiment of an AC/DC converter.

FIG. 1 very schematically shows an embodiment of an AC/DC converter.

Converter 1 has, in this example, the function of converting an AC voltage VAC, for example, the voltage of the electric distribution network, applied between two nodes or terminals 11 (VAC) and 13 (COM) into a DC voltage VDC across a capacitive element C, between two nodes or terminals 15 (V+) and 17 (V−).

The rectifying structure is formed of four switches T1, T2, T3, T4, typically N-channel field-effect transistors distributed in two branches I and II, each comprising two switches in series between nodes 15 and 17, the two branches thus being in parallel between nodes 15 and 17. First branch I comprises transistors T1 and T2 in series between nodes 15 and 17, midpoint 16 (source of transistor T2 and drain of transistor T1) being coupled, preferably connected, to node 13. Second branch II comprises transistors T4 and T3 in series between nodes 15 and 17, midpoint 18 (source of transistor T4 and drain of transistor T3) being coupled, preferably connected, to node 11. The drains of transistors T2 and T4 are interconnected or common. The sources of transistors T1 and T3 are interconnected or common.

Each transistor T1, T2, T3, T4 is controlled by a bias circuit or driver 21 (DRV1), 22 (DRV2), 23 (DRV3), and 24 (DRV4) supplying, on the gate of the concerned transistor, a square-pulse control signal. The function of circuits 21, 22, 23, 24 is to shape digital square-pulse signals LFLS, LFHS, HFLS, and HFHS, supplied by a microcontroller (not shown in FIG. 1).

The N-channel transistors being turned on by application of a positive gate-source voltage, circuits 21 and 24 have to be appropriately powered to be able to shape the control signals. Thus, the low or reference level of the power supply voltage of circuits 21 to 24 corresponds to the source potential of the corresponding transistor T1 to T4. The high or positive level of the power supply voltage of each circuit 21 to 24 must further be greater by a value corresponding to at least the threshold voltage of transistors T1 to T4 to be able to apply to the gate of the concerned transistor a gate-source voltage sufficient to turn it on. Thus, circuits 21 and 23 for controlling transistors T1 and T3, generally called "low" or "low side" are powered with a voltage VCCL referenced to node 17. Circuits 22 and 24 for controlling transistors T2 and T4, generally called "high" or "high side" are powered with a voltage VCCH referenced to node 16 for circuit 22 (source of transistor T2) and by a voltage VCCH2 referenced to node 18 for circuit 24 (source of transistor T4). Transistors T1, T2, T3, and T4 all being of same type (N-channel), their control voltages have to be referenced to their respective sources.

The generation of voltages VCCH, VCCH2, and VCCL generally uses one or a plurality of regulators 31 (LDO) of series low drop-out linear regulator type, powered via a transformer 33. A winding or primary inductive element 35 of transformer 33 is interposed between nodes 11 and 18. A winding or primary inductive element 37 of transformer 33, magnetically coupled to first winding 33, delivers a low voltage (typically of a few volts and lower than 10 volts) to regulator(s) 31.

A converter such as illustrated by FIG. 1 has a usual operation. First branch I, generally called inverter or rectifier branch, is controlled at a frequency close, preferably identical, to the frequency of AC voltage VAC, that is, typically lower than one kilohertz, for example, from a few tens of Hertz (50 or 60 Hz for the electric distribution network) to a few hundreds of Hertz for the AC networks of airplanes. The second branch, generally called regulation branch or switching branch, is controlled at a frequency from a plurality of kilohertz to a few Megahertz, in pulse-width modulation according to the energy needs of the load powered by voltage VDC. Signals HFHS and HFLS thus are high-frequency signals with respect to signals LFHS and LFLS which are at low frequency.

In a converter of the type of that in FIG. 1, a difficulty lies in the conversion of the digital signals supplied by the controller into gate control signals of the transistors. In a conventional converter, all the digital signals are referenced to the lowest potential, that is, potential V−. The control of transistors T1 and T3 then raises no issue, the references of signals HFLS and LFLS being the same as those of the control signals supplied by circuits 21 and 23. However, on the side of circuit 22 for controlling the high transistor T2 of the inverter branch, it is conventionally necessary to provide an insulator between the controls signals LFHS supplied by the microcontroller and the reference potential (potential COM) of the signal supplied by circuit 22. Indeed, potential COM is floating and is submitted to strong values of dV/dt having, as an amplitude, the amplitude of several hundreds of volts of voltage VAC. The use of this potential as a potential reference for the control signal of transistor T2, generated from signals supplied by a microcontroller powered with a voltage of a few volts, requires a galvanic isolation or a level shifter between reference V− (node 17) of the power supply voltage of the microcontroller and potential COM, which complicates the circuit.

The embodiments of the present disclosure aim at avoiding the need for an isolator or for a level shifter to generate the control signals of the inverter branch and more particularly of the high transistor of an inverter branch.

For this purpose, it is provided to reference the digital control signal of the high transistor of the inverter branch to the reference potential of the AC voltage. In other words, it is provided to reference the power supply voltage of the controller, generating the control signals, to the potential of the midpoint between the transistors of the inverter branch.

Figure 2:
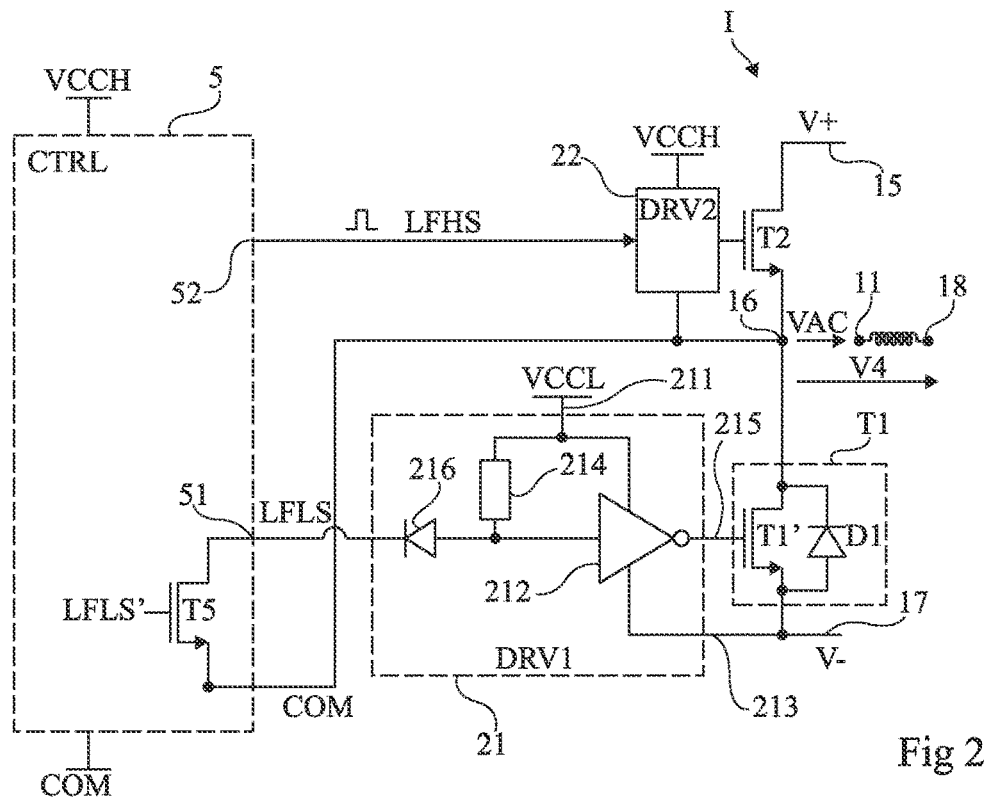
FIG. 2 very schematically shows an embodiment of an inverter branch and of an electronic control module.

FIG. 2 very schematically shows an embodiment of an inverter branch and of an electronic control module.

For simplification, only the inverter branch I of the converter of FIG. 1 is shown in FIG. 2. However, the described embodiments apply to an inverter branch alone or associated with another branch of a power converter, for example, a regulation or switching branch of the type of that described in relation with FIG. 1. It will thus be referred to elements of the converter of FIG. 1 when this is useful to the discussion of the structure or of the operation of the device of FIG. 2.

The inverter branch is, as previously, formed of two field-effect transistors T2 and T1, in series between nodes 15 (V+) and 17 (V) of a DC voltage VDC (FIG. 1). Each transistor T1, T2 is controlled from a square-pulse signal LFLS, LFHS supplied by a controller 5 (CTRL) and transiting through a shaping circuit 21 (DRV1), respectively 22 (DRV2) of the described control module.

According to the described embodiments, the power supply of controller 5 is referenced to the potential COM of node 16, which is thus used as a reference to digital signals LFHS and LFLS. The positive power supply potential of controller 5 is, for example, the potential VCCH generated by linear regulator 31 (FIG. 1) or another potential of a few volts (for example, in the order of 3.3 volts), referenced to potential COM.

The fact of referencing the power supply potential of controller 5 to potential COM considerably simplifies the control of the transistors of the inverter branch. In particular, no galvanic isolation circuit, nor reference level shifter, is necessary at the level of the circuits 21 and 22 of the control module.

In the example of FIG. 2, it is assumed that the outputs supplying signals LFHS and LFLS are open-drain, that is, they are formed of drains of N-channel transistors (T5 for the low stage) having their sources at the reference potential COM of the power supply of controller 5.

Thus, on the side of circuit 22, transistor T2 may, in a simplified embodiment, be directly controlled by the signal LFHS originating from microcontroller 5 (output terminal 52). Preferably, a shaping circuit 22 is however provided, formed of a simple dual MOS inverter as will be seen hereafter in relation with FIG. 4, powered with voltage VCCH referenced to potential COM. No offset of the reference potential is however required.

On the side of circuit 21, it is sufficient to reverse a control signal LFLS' to obtain the signal LFLS to be applied to the gate control circuit 21 of transistor T5. Thus, transistor T5 supplies, on its drain, signal LFLS. Transistor T5 is controlled by a signal LFLS' generated to respect a lack of simultaneous conduction of transistors T1 and T2. Circuit 21 comprises, in this example, an inverter amplifier 212, powered between potentials VCCL (node 211) and V− (node 213 or 17), having its output coupled, preferably connected, to the gate of transistor T1. The input of amplifier 212 is coupled to terminal 211 by a pull-up resistor and, via a diode 216, to the drain of transistor T5 (output terminal 51 of controller 5).

The operation of the inverter branch I of FIG. 2 uses a reverse conduction of transistor T1. Advantage is taken of the presence, in the case of a MOSFET transistor formed on silicon, of the intrinsic diode D1 which is present in the N-channel transistor forming transistor T1 to use the reverse conduction of transistor T1. Thus, transistor T1 corresponds, as illustrated in FIG. 2, to a transistor T1', having a diode D1 present between its source and its drain, the anode of diode D1 being on the source side of transistor T1'.

Further, the presence of an inductive element on the terminal at potential COM is advantageously used. This inductive element corresponds, in the example of FIG. 1, to the primary winding 35 of transistor 33. As a variant, a terminal of an inductive element is directly connected to terminal 16.

Figure 3:
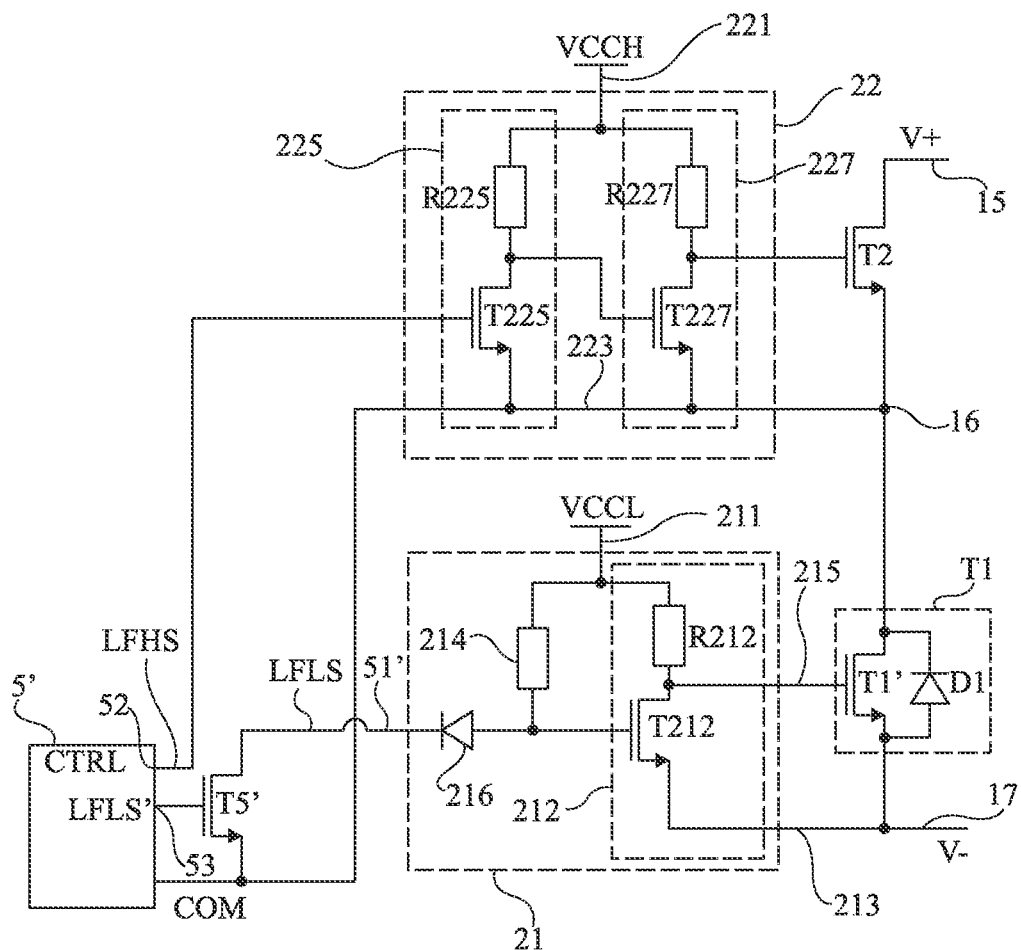
FIG. 3 very schematically shows another embodiment of an electronic device.

FIG. 3 very schematically shows another embodiment of an electronic device.

In the example of FIG. 3, it is assumed that the transistor T5' supplying signal LFLS is external to controller 5'. Signal LFLS' is then supplied on an output 53 of the controller coupled, preferably connected, to the gate of external transistor T5' having its drain coupled, preferably connected, to node 16. The source of transistor T5' is coupled, preferably connected, to the cathode of diode 216 of circuit 21 (node 51'). In the embodiment of FIG. 3, inverter 212 is illustrated in the form of a resistor R212 in series with a MOS transistor T212 between terminals 211 and 213, transistor T212 being on when diode 216 is off. The node 215 between resistor R212 and transistor T212 (drain of transistor T212) is coupled, preferably connected, to the gate of transistor T1'.

Circuit 22 is illustrated, in this example, in the form of two successive MOS inverters. A first inverter 225 comprises a resistor R225 in series with a MOS transistor T225, with an N channel, between power supply terminals 221 and 223 of circuit 22, respectively coupled, preferably connected, to the nodes at potentials VCCH and COM. The gate of transistor T225 is coupled, preferably connected to the terminal 52 of controller 5'. A second inverter 227 comprises a resistor R227 in series with a MOS transistor T227, with an N channel, between terminals 221 and 223. The gate of transistor T227 is coupled, preferably connected, to the drain of transistor T225, and thus to the node of connection of resistor R225 to transistor T225. The drain of transistor T227 (node between resistor 227 and transistor T227) forms the output of circuit 22 coupled, preferably connected, to the gate of transistor T2.

Figure 4:
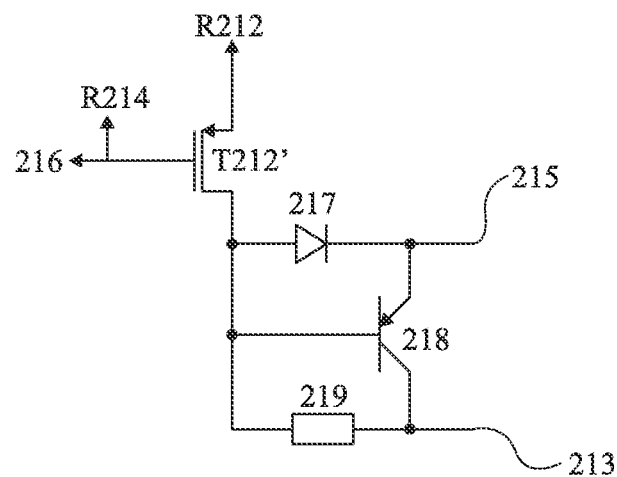
FIG. 4 very schematically shows a detail of the device of FIG. 3 according to an alternative embodiment.

FIG. 4 very schematically shows a detail of the device of FIG. 3 according to an alternative embodiment.

In the example of FIG. 4, the transistor T212 of FIG. 3 is replaced with a P-channel transistor T212' having its source coupled to terminal 211 by resistor R212 (not shown) and having its gate coupled, by resistor 214 (not shown) to terminal 211, and by diode 216 to node 51' (FIG. 3). The drain of transistor T212' is coupled, via a diode 217, to node 215, the anode of diode 217 being on the drain side of transistor T212'. A bipolar transistor 218 (PNP) couples nodes 215 and 213, the base of transistor 218 being coupled, preferably connected, to the drain of transistor T212' and, by a bias resistor 219, to node 213.

The assembly of FIG. 4 amounts to forming an inverter of the type of that of FIG. 3, transistor 218 being off when transistor T212' is on and thus when diode 216 is on.

The operation of the described embodiments depends on the variation of the voltage (V4, FIGS. 1 and 2) between nodes 18 and 16 over time, and thus on the sign of voltage V4 with respect to sine-wave voltage VAC.

Figure 5:
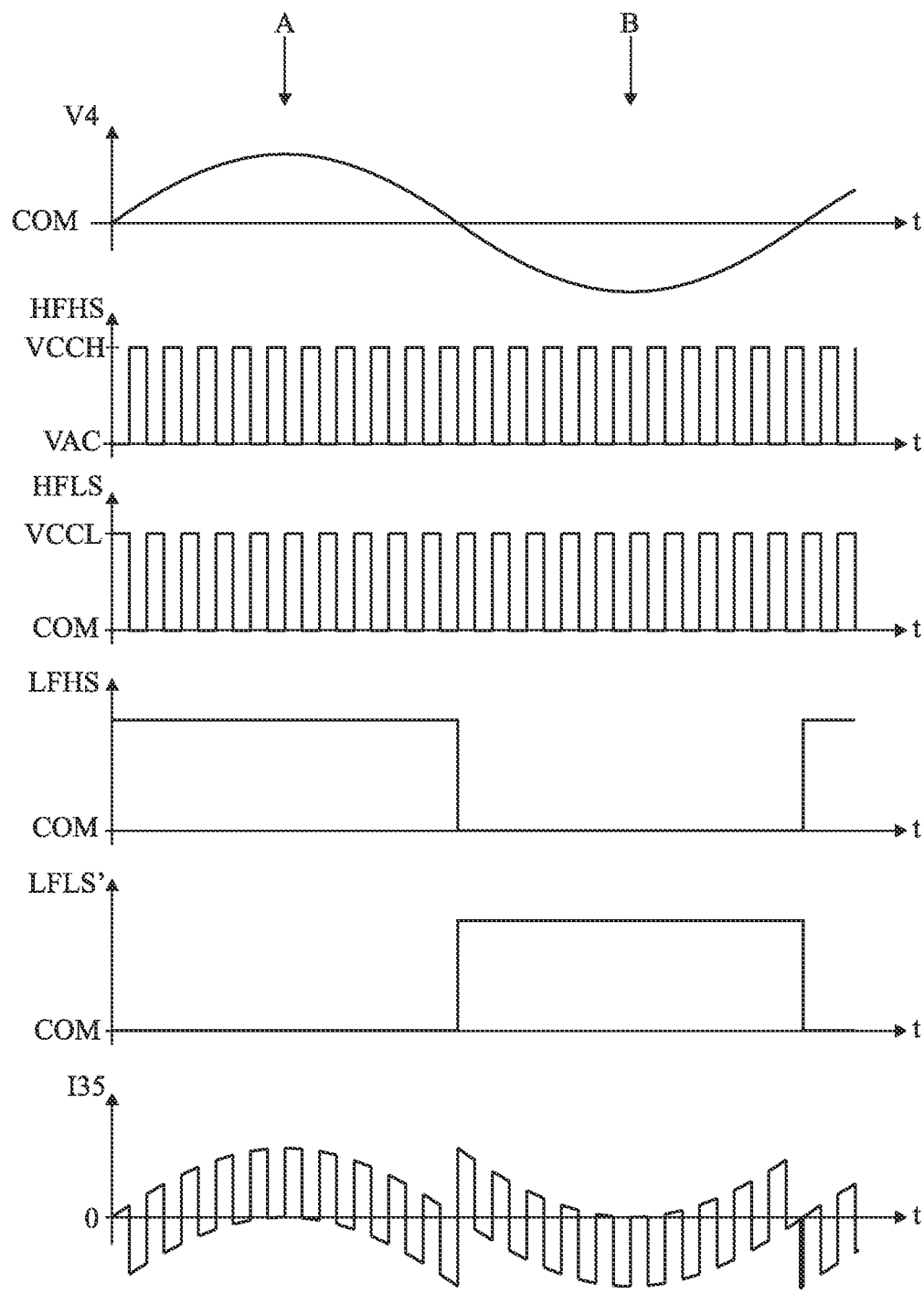
FIG. 5 illustrates, in the form of timing diagrams, an operating mode of the assembly of FIG. 3 in a converter of the type of that illustrated in FIG. 1.
Figure 6:
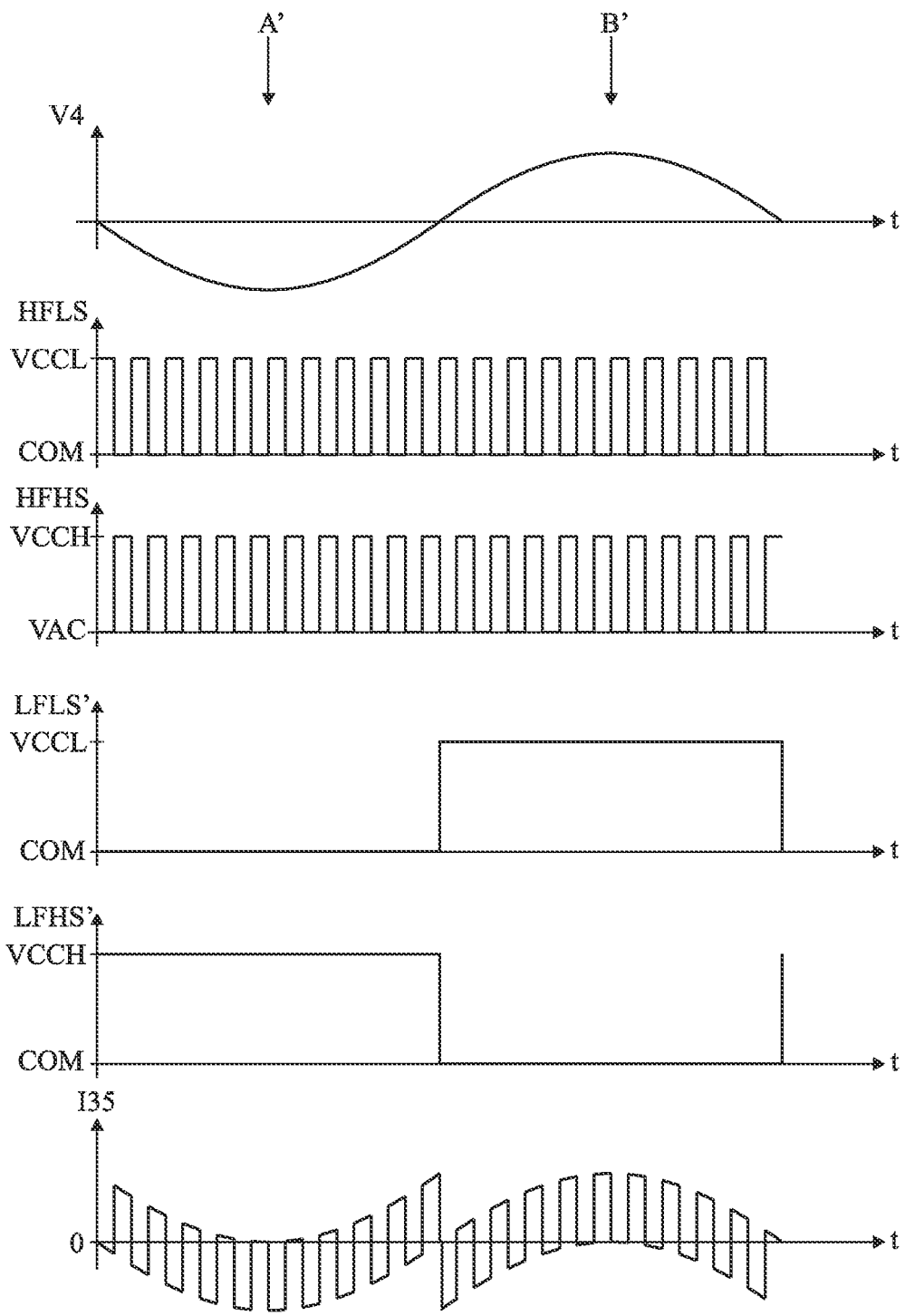
FIG. 6 illustrates, in the form of timing diagrams, another operating mode of the assembly of FIG. 3 in a converter of the type of that illustrated in FIG. 1.

This operation is illustrated hereafter by FIGS. 5 and 6, which illustrate two scenarios according to whether voltage V4 is in phase or in phase opposition with voltage VAC. The current I35 in inductance 35 is taken, by convention, in the direction from node 11 to node 18.

FIG. 5 illustrates, in the form of timing diagrams, the operation of the assembly of FIG. 3 in a converter of the type of that illustrated in FIG. 1 in the case where voltage V4 is positive during the first (positive) half-period of voltage VAC.

These timing diagrams respectively show examples of shapes of voltage V4, of signal HFLS, of signal HFHS, of signal LFHS, of signal LFLS' for controlling transistor T5', and of the current 135 in inductive element 35.

During first half-period A, voltage V4 is positive (with respect to reference COM). Signal LFHS is in the high state. Accordingly, transistor T225 is on and transistor T227 remains off and the output of circuit 22 is in the high state, turning on transistor T2. On the low side, signal LFLS' is in the low state. Transistor T5' (or T5, FIG. 2) is thus off, which makes the cathode of diode 216 floating. The gate of transistor T212 is then biased to potential VCCL by resistor 214. Transistor T212 conducts and forces the gate of transistor T1' to the low level, keeping it off. Diode D1 is also off, potential COM being higher than potential V−. During this half-period, the current 135 in the inductance is positive and flows through transistor T3 or through transistor T4 according to the state of signals HFHS and HFLS, while being fed back by transistor T2, which is on.

During second half-period B, voltage V4 is negative. Signal LFHS is in the low state and transistor T225 remains off, which turns on transistor T227 and blocks transistor T2. The current in inductance 35 however keeps on flowing, transistor T1 being in reverse conduction through diode D1 (voltage V4 having become negative). Current 135 thus flows according to the state of signals HFHS and HFLS, through transistor T4, capacitor C, and diode D1, or through transistor T3 and diode D1. On the low side, signal LFLS' is in the high state. Transistor T5' (or T5) is thus on, which discharges the gate of transistor T212 via diode 216. The turning off of transistor T212 causes, via resistor R212, the setting to the high state of the gate of transistor T1', which turns on.

FIG. 6 illustrates, in the form of timing diagrams, the operation of the assembly of FIG. 3 in a converter of the type of that illustrated in FIG. 1 in the case where voltage V4 is negative during the first (positive) half-period of voltage VAC.

These timing diagrams respectively show examples of shapes of voltage V4, of signal HFLS, of signal HFHS, of signal LFLS' for controlling transistor T5', of signal LFHS, and of the current 135 in inductive element 35.

During first half-period A', voltage V4 is negative (with respect to reference COM). Signal LFHS is in the high state. Accordingly, transistor T225 is on and transistor T227 remains off and the output of circuit 22 is in the high state, turning on transistor T2. On the low side, signal LFLS' is in the low state. Transistor T5' (or T5, FIG. 2) is thus off, which makes the cathode of diode 216 floating. The gate of transistor T212 is then biased to potential VCCL by resistor 214. Transistor T212 conducts and it forces the gate of transistor T1' to the low level, keeping it off. Diode D1 is also off, potential COM being higher than potential V−. During this half-period, the current 135 in the inductance is negative and flows through transistor T2 and, according to the state of signals HFHS and HFLS, by transistor T4 or by capacitor C and transistor T3.

During second half-period B', voltage V4 is positive. Signal LFHS is in the low state and transistor T225 remains off, which turns on transistor T227 and turns off transistor T2. The current in inductance 35 however keeps on flowing through transistor T2 in reverse (through its intrinsic diode) and, according to the state of signals HFHS and HFLS, capacitor C and transistor T3, or transistor T4. When transistor T3 conducts, voltage V4 is positive, transistor T1 is forced in reverse conduction and potential V− becomes equal to potential COM. On the low side, signal LFLS' is in the high state. Transistor T5' (or T5) is thus on, which discharges the gate of transistor T212 via diode 216. The turning off of transistor T212 causes, via resistor R212, the setting to the high state of the gate of transistor T1' which turns on.

An advantage of the above-described embodiments is that they enable to avoid using an isolator or shifter of the power supply potential reference level of the controller with respect to the rest of the circuit.

The described embodiments are particularly adapted to an integration based on transistors called high electron mobility transistors HEMT, that is, achieving a conduction between the drain and the source via an interface between wide bandgap semiconductors, the electrons being mobile along said interface. The semiconductors may be gallium nitride GaN and aluminum-gallium nitride AlGaN. It is then spoken of a GaN HEMT-type transistor.

An HEMT-type switch or transistor may possibly comprise, or be formed by, an HEMT-type transistor, preferably with GaN, or a plurality of HEMT-type transistors, preferably with GaN, in series and/or in parallel. HEMT transistors enable to block higher voltages and enable a faster switching than other types of field-effect transistors.

Preferably, the transistors comprised in, or forming, the N-channel HEMT-type transistors, are enhancement-mode HEMTs. These switches or transistors are then of normally-off type, that is, off in the absence of a control voltage (gate-source voltage). As a variant, the transistor(s) comprised in, or forming, one and/or the other of the HEMT-type transistors may also be depletion mode HEMTs. The concerned switch is also of so-called depletion HEMT type. Such switches or transistors are then of so-called normally-on or conducting type, that is, conducting in the absence of a control voltage (in other words, with a null control voltage). In particular, the resistive elements may be formed by normally-on transistors.

In the case of an HEMT-type transistor (as in the case of a transistor made of silicon carbide or SiC, which forms another variant), the transistor does not properly speaking comprise an intrinsic diode (as opposed to a MOSFET-type transistor formed on silicon) but has a reverse operation allowing a conduction as a diode would do. Accordingly, the operation discussed with transistors T1 and T2 with an intrinsic diode D1 transposes to transistors of GaN or SiC type.

According to an embodiment, it is provided to detect the polarity of potential COM with respect to a reference external to the inverter branch (and thus the biasing of voltage VAC) to prevent any simultaneous turning on of the transistors of a same branch, independently from the control signals generated by the controller (5 or 5'). This enables to secure the operation of the converter in case of a malfunction of the microcontroller.

Figure 7:
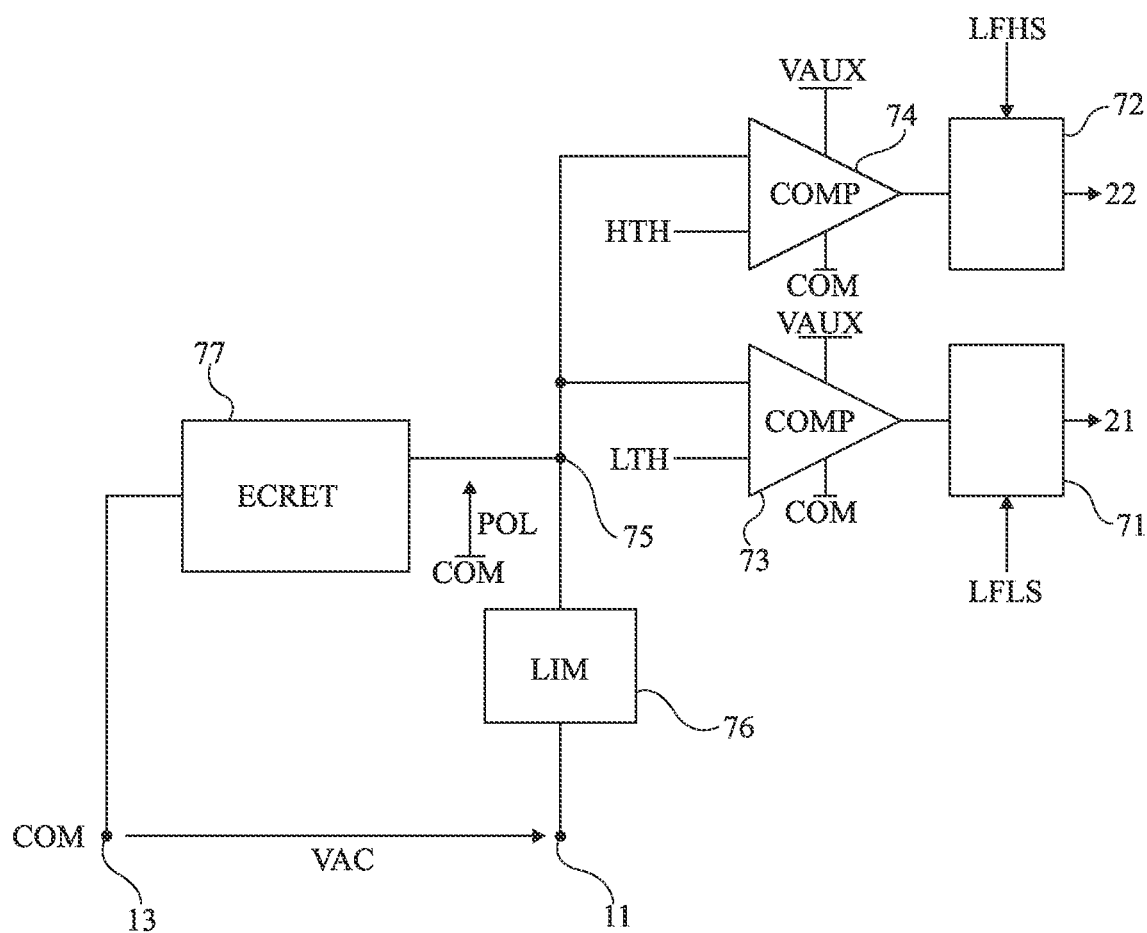
FIG. 7 very schematically shows in the form of blocks an example of a circuit for validating control signals of an inverter branch.

FIG. 7 very schematically shows in the form of blocks an example of a circuit for validating control signals of the high and low stages of an inverter branch according to the biasing of voltage VAC.

According to this example, there are interposed between the signals LFLS and LFHS generated by the microcontroller and the respective control circuits 21 and 22, logic circuits 71 and 72 allowing or not the transmission of signals LFLS and LFHS. These circuits 71 and 72 are controlled by comparators (COMP) 73 and 74 of a level POL of a node 75 representative of the biasing of AC voltage VAC. Comparator 73 has the function of detecting when voltage VAC is negative, to authorize the turning on of transistor T1. Comparator 74 has the function of detecting when voltage VAC is negative, to authorize the turning on of transistor T2. Signal POL is obtained by limiting voltage VAC (limiter 76 between node 11 and node 75) and preferably by clamping the level of node COM (clamp 77 between node 13 and node 75). Signal POL is compared, by comparator 74, with a low threshold LTH and, by comparator 73, to a high threshold HTH. Comparators 73 and 74 are powered with a voltage VAUX, referenced to potential COM, but external to the inverter branch. It may be, for example, voltage VCCH.

The assembly illustrated in FIG. 7 further comprises logic circuits for supplying control signals (LFHS, LFLS) to the first (21) and second (22) circuits, these circuits being controlled by detectors of the biasing of the AC voltage with respect to said midpoint (16).

Various embodiments and variants have been described. Those skilled in the art will understand that certain features of these various embodiments and variants may be combined, and other variants will occur to those skilled in the art.

Finally, the practical implementation of the described embodiments and variations is within the abilities of those skilled in the art based on the functional indications given hereabove. In particular, the practical forming of a circuit of the type of that of FIG. 7 is within the abilities of those skilled in the art based on the provided functional indications.

What is claimed is:

1. Electronic device comprising:
   a first switch having a single voltage blocking direction;
   a second switch, electrically in series with the first switch between a first node and a second node of application of a DC voltage;
   a module configured to supply the second switch with a control signal, referenced to a potential of a third node corresponding to a midpoint between the first and second switches and comprising:
      a first circuit for controlling the first switch, configured to receive a first square-pulse control signal, referenced to the potential of said third node;
      a second circuit for controlling the second switch, configured to receive a second square-pulse control signal, referenced to the potential of said third node, the first circuit comprising:
         an assembly for shaping the first square-pulse control signal between a level of a first terminal for supplying a first positive potential positive with respect to said level of the second node and said second node, the assembly comprising an inverter amplifier;
         a first diode between the input of the inverter amplifier and a second input terminal of the first circuit to which is applied the first square-pule control signal, the anode of the first diode being on a side of an input of the inverter amplifier; and
         a first resistor between the first terminal and the input of the inverter amplifier; and
      a controller and a field-effect transistor internal or external to said controller, connecting the cathode of the first diode to said third node, said field-effect transistor being controlled by a signal representing an inverse of the first square-pulse control signal.

2. The electronic device according to claim 1, wherein said third node is coupled to a fourth node of application of an AC voltage.

3. The electronic device according to claim 2, further comprising a circuit for validating said first and second square-pulse control signals according to a biasing of the AC voltage.

4. The electronic device according to claim 3, wherein said validation circuit comprises logic circuits for supplying the first and second square-pulse control signals to the first and second circuits, these logic circuits being controlled by detectors of the biasing of the AC voltage with respect to said third node.

5. The electronic device according to claim 1, wherein the inverter amplifier comprises, in series between the first terminal and the second node, a second resistor and a MOS transistor, the gate of the MOS transistor being coupled to the anode of the first diode and a midpoint between the second resistor and the MOS transistor being coupled to a third control terminal of the first switch.

6. The electronic device according to claim 1, wherein the inverter amplifier comprises in series between the first terminal and the second node, a second resistor, a MOS transistor and a third resistor, the drain of the MOS transistor being connected, via a second diode, to a third control terminal of the first switch, a bipolar transistor, the base of which is coupled to the drain of the MOS transistor connecting the third control terminal to the second node.

7. The electronic device according to claim 1, wherein the first switch has a reverse conduction, like a diode.

8. The electronic device according to claim 7, wherein the first switch comprises at least one diode having its cathode facing said third node.

9. The electronic device according to claim 1, wherein the first switch further comprises a field-effect transistor.

10. The electronic device according to claim 1, wherein the second circuit comprises, between an input terminal of application of the second square-pulse control signal and an output terminal, an assembly for shaping the second square-pulse control signal between a second positive potential and said potential of said third node.

11. The electronic device according to claim 1, wherein the first switch and the second switch are N-channel field-effect transistors.

12. The electronic device according to claim 11, wherein the field-effect transistors are HEMT transistors.

13. Power converter comprising:
    the electronic device according to claim 1; and
    a third switch and a fourth switch in series between the first node and the second node of application of the DC voltage.

14. Method of controlling the electronic device according to claim 1, wherein the third node is coupled to a fourth node of application of an AC voltage, comprising setting to the on state of the first switch and setting to the off state of the second switch when the AC voltage has a first sign, and the setting to the off state of the first switch and the setting to the on state of the second switch when the AC voltage has a second sign.

15. AC/DC converter, comprising the electronic device according to claim 1.

16. AC/DC converter, comprising the electronic device configured to implement the method according to claim 14.

* * * * *